Patented Nov. 11, 1952

UNITED STATES PATENT OFFICE 2,617,774

PREPARATION OF AN IRON-SILICA GEL FISCHER-TROPSCH CATALYST

Walter Rottig, Oberhausen-Sterkrade-Nord, Hans Werner Gross and Paul Royen, Frankfort-on-the-Main, and Karl Schenk, Oberhausen-Sterkrade-Nord, Germany, assignors to Ruhrchemie Aktiengesellschaft, Oberhausen-Holten, and Lurgi Gesellschaft Fuer Waermetechnik m. b. H., Frankfort-on-the-Main, Heddernheim, Germany No Drawing. Application September 9, 1950, Serial No. 184,114. In Germany September 13, 1949

3 Claims. (Cl. 252—451)

This invention relates to new and useful improvements in preparations of an iron-silica gel Fischer-Tropsch catalyst.

In the catalytic hydrogenation of carbon monoxide with iron catalysts, it is desired to achieve not only a high rate of conversion but also the best possible proportionate utilization of the synthesis gases, i. e., carbon monoxide and hydrogen are to be utilized in substantially the proportion in which they are present. Furthermore, it is desired to obtain the highest possible catalyst load and the lowest possible methane formation. The iron catalyst used may be carrier containing or substantially carrier-free catalysts. Diatomaceous earth is a preferred carrier material, while in special cases, however, other materials such as activated aluminum oxide, bleaching earth, and similar materials may be used.

Carrier containing iron catalysts possess a fairly good utilization ratio at synthesis pressures in excess of about 5-10 kg. per square centimeter which ratio may become almost proportionate when reacting, for example, water gas, and giving conversions of up to 60% $(CO+H_2)$. The dilution of the catalyst metal caused by the carrier material requires, however, a fairly high synthesis temperature in order to attain such a high conversion rate. When using a gas load of about 100 parts per volume of gas per liter catalyst material which is conventionally considered normal, it is necessary to maintain synthesis temperatures of approximately 250° C. If the gas load is increased, however, to a multiple of the normal load, the synthesis temperature has to be increased to such a large extent that the synthesis process become uneconomical by reason of the increased formation of methane and deposit of carbon.

When using substantially carrier free iron catalysts, the synthesis may be carried out at temperatures which are approximately 30-40° C. lower than those required for carrier containing catalysts. With a straight passage of the synthesis gases, the load may be increased under such conditions to a value of 10-20 times that of the above-referred to normal load, and yet permitting the obtaining of a conversion $(CO+H_2)$ of up to 70%. This does involve the disadvantage, however, that the substantially carrier free iron catalysts will cause to an appreciable extent a conversion of the individual gas components. Consequently, the remaining residual gas is so rich in hydrogen that it is impossible either directly or with the use of subsequently cut in synthesis stages to obtain an increase of the conversion rate up to about 90% $(CO+H_2)$ and higher.

In the production of iron catalysts precipitated from solutions of metal salt and containing potassium and silica acid, various individual expedients are known either as such or in combination for the purpose of improving the synthesis characteristics. It has thus been proposed to obtain the precipitation of the catalyst metal from hot metal nitrate solutions with hot caustic solution while substantially maintaining predetermined hydrogen ion concentration, it being necessary to have, compared to the stoicheiometric ratio, a rather high excess of soda. During the precipitation period, the solutions are intensively stirred. Moreover, the precipitation is directed in such a manner that, with termination of the precipitation, the desired pH value is present. It has further been found that it is possible to influence the synthesis characteristics of iron catalysts to an appreciable extent by their impregnation with alkali compounds, and preferably with potassium compounds. In the practice of this expedient, potassium water glass has been used for the impregnation. If an iron catalyst is, for instance, impregnated with 8-10 parts $K_2O$ and 40-50 parts $SiO_2$ for each 100 parts of its iron content, it is possible to obtain at temperatures between 220 and 240° C. and substantially normal load and recycling of the gases, conversion rates of about 60-70%

$(CO+H_2)$

With increased load, however, as for example a load ten times that of normal, entirely too much methane is formed, and at the same time undesired carbon deposit may occur. Iron catalysts have also been impregnated in such manner that about 1-1.5 parts of $K_2O$ and 3-5 parts of $SiO_2$ result for every 100 parts of iron. Though it was possible to operate such catalysts with increased gas load, an unsatisfactory proportionate utilization was obtained and a high methane formation.

The composition of the iron catalysts is of very different kind. For instance, iron catalysts are known being activated with 0.5 to 25% copper (calculated from the iron content). Also silver, calcium oxide, barium oxide and aluminum oxide are known as activation agents for iron catalysts.

It has been still further proposed for the purpose of improving the synthesis characteristics to apply to the reduction of the iron catalysts a variety of different methods operating with high as well as low reduction temperatures. In the practice of these expedients, partly high velocities and partly low velocities of the reduction gases have been used. Still further, the composition of the reduction gases has been widely varied, using substantially pure hydrogen as well as carbon monoxide-hydrogen mixtures, and in special cases pure carbon monoxide.

With all these hitherto known combinations of these preparation expedients, it has been up to now impossible to obtain iron catalysts combining satisfactorily a high gas load capacity, high conversion capacity, a capacity for proportionate utilization of the synthesis gases, and a low methane formation.

It has been discovered that it is possible to obtain with an entirely novel combination of as such known individual expedients, iron catalysts which will convert, for example, water gas at a gas load of 10-20 times that of normal to in excess of 90%, utilizing only a two stage operational procedure. The method in accordance with the invention for producing the substantially carrierless iron catalysts which may contain small amounts of copper or similar metals as auxiliary components, essentially comprises precipitating a hot solution of the metal nitrate used, while intensively stirring, with a hot caustic soda solution in such manner that the pH value after the precipitation is about 6.8-7.2, washing the precipitated mass down to a $K_2O$ calculated content of at the most 0.5 part by weight of $K_2O$ for every 100 parts by weight of iron content, stirring at first with a small amount of water for the purpose of comminution, thereafter converting into a suspension by the addition of further amounts of water, adding to this suspension amounts of a potassium water glass solution sufficient to yield 20-25 parts by weight $SiO_2$ for every 100 parts by weight of iron contained in said catalyst, thereafter adding nitric acid in amount sufficient to yield for the catalyst mass remaining after filtration a $K_2O$ to $SiO_2$ ratio of about 1:4-1:5, thereafter drying this catalyst mass and immediately molding the whole residue, and finally subjecting the molded catalyst to a reduction with a reducing gas at temperatures of about 200-350° C. and preferably 260-300° C. using relatively high gas velocities of about 1-2 meter per second and carrying the reduction to a point at which the catalyst contains about 30-50% of its total iron content in the form of substantially free iron.

When using iron catalysts prepared in accordance with the invention, it is possible to convert water gas with only a two-stage operation to in excess of 90% with a gas load which is 10-20 times that of normal. One of the two synthesis stages is operated with straight passage of synthesis gas, while the other is operated with gas recycling, whereby a ratio of gas to recycled gas of from 1:1 to 1:3 is used.

The precipitation of the solution of metal nitrate may also be effected with potassium carbonate. The use of alkali salts of silicic acid is important for the impregnation of the catalysts, since the characteristics of the new catalyst in accordance with the invention are not obtainable with alkali hydroxide, carbonate acetate or similar salts. Potassium water glass, however, is by far most suitable. The pH value of 6.8-7.2 is critical for the precipitation because the precipitated catalyst mass is only difficultly filterable and washable at pH values which are higher or lower than those given. For the purpose of stirring the press-off filter cake, the amounts of water specified for the comminution and formation of the suspension must be observed, since it is otherwise not possible to obtain the desired impregnation with a sufficient degree of certainty. The quantities of water being required for the stirring of the press-off filter cake amount to about 25% to 35% of the weight of the moist cake. These amounts of water must be maintained.

The treatment of the precipitated catalyst mass with nitric acid in accordance with the invention is carried through to a pH value of 6.8-7.2. The amount of $NH_3$ required is dependent, on the one hand, on how much $K_2O$, calculated upon its iron content, the catalyst is to contain. Moreover, there is to be taken account for the $SiO_2/K_2O$ ratio desired. These data have to be determined prior to the preparation of the catalyst. After the treatment of the catalyst mass a repeated filtration is effected for the purpose of separating off the water.

The moulding of the moist catalyst mass which is in a gelatinous condition is practised by pressing it through a perforated plate at a pressure above 5 kilogram per square centimeter, resulting in thread-shaped bodies, which then are dried, reduced to small pieces and sieved to a fixed size. There are only small amounts of pulverulent components with the iron catalyst according to the invention. These pulverulent components are not returned into the catalyst preparation.

In the reduction of iron catalyst in accordance with the invention efficient and active catalysts are obtained only when utilizing relatively high gas velocities. When using low gas velocities, such as hitherto practised, iron catalysts of insufficient activity are obtained. The reduction of the catalyst may be carried out with hydrogen, carbon monoxide and carbon monoxide hydrogen mixtures, for instance water gas. These reduction gases may also contain more or less large amounts of nitrogen.

The reaching of the reduction degree of 30 to 50% of free iron relative to the total iron content being required in accordance with the invention is dependent on the temperature and composition of the reduction gases and on the duration of the reduction. With carbon monoxide containing gases the reduction may be accomplished in a shorter time or, if the duration remains the same, at a lower temperature.

EXAMPLE 1000 liters of a hot solution containing per liter 40 g. iron in the form of $Fe(NO_3)_3$ and 2 g. Cu in the form of $Cu(NO_3)_2$ were admixed with 1050 liters of a hot solution containing per liter 100 g. $Na_2CO_3$ while vigorously stirring the mass. The stirring of the mix was continued until the split-off carbon dioxide was completely removed for which purpose the mix was maintained at a constant boil. In the precipitation of the solutions of metal nitrate a fastly rotating intensive-stirrer is employed having, for instance, 1500 rotations per minute.

Upon completed precipitation, the mix showed a pH value of about 7.0. The precipitated metal compounds were then separated in a filter press from their solution, and they were immediately thereafter washed with hot condensate water for 30 minutes at a pressure of 3 kg./cm.² in excess of atmospheric for the purpose of removing the alkali to an appreciable extent. When observing the pH value of 7, the alkali content of the filter cake may be lowered without difficulty to a point that the same (calculated as $K_2O$) is about 0.4 part by weight of $K_2O$ for each 100 parts by weight of iron. If, on the other hand, the precipitation is effected at an alkaline pH, it was impossible to obtain in spite of an appreciably prolonged washing, a reduction of the alkaline content below about 1.5–2 parts by weight of $K_2O$ for each 100 parts by weight of iron.

The washed filter cake was then stirred to a slurry with little water in a mixer for the purpose of obtaining the best possible comminution of the moist mass. For this purpose, there were added 30 liters of water for every 100 kg. of the moist filter cake. The comminuted catalyst mass was thereupon mixed with further 350 liters of water until a substantially uniform suspension of almost silk-like consistency was obtained. Immediately thereafter, 17 kg. potassium water glass solution were added, the same containing about 8.1% $K_2O$ and about 20.5% $SiO_2$.

The suspension impregnated with the potassium water glass was then neutralized with 2.1 liters of nitric acid (48% $HNO_3$) for every 100 kg. of the moist filter cake, the acid being added with intensive stirring in a thin stream. After the neutralization, the suspended material was filtered from the solution in a filter press. The separated filter cake contained about 100 parts by weight of iron (Fe), 4.6 parts by weight of $K_2O$, and 23 parts by weight of $SiO_2$.

The filter cake was then molded without return of pulverulent components into cylindrical particles of about 2–4 mm. diameter and 3–6 length, whereby extraordinarily hard and resistant catalyst particles were obtained. These were then reduced at about 280° C. with a hydrogen-nitrogen mixture for about 60 minutes, utilizing a gas velocity of about 1.5 m. (linear velocity measured cold) per second. The reduced catalyst thus obtained contained about 42% of the total iron content in the form of free iron.

We claim:

1. Method for production of iron catalysts for the catalytic carbon monoxide hydrogenation which comprises adding to a solution of iron nitrate conventionally used for the preparation of carbon monoxide hydrogenation catalyst an iron hydroxide precipitant in amount sufficient to obtain a pH endpoint of from about 6.8 to 7.2 while continuously stirring, separating the precipitate, washing the same to reduce its alkali contents to a maximum of 0.5 part by weight of $K_2O$ for each 100 parts by weight of iron content in said precipitate, adding further amounts of water to said slurry to thereby obtain a suspension of said precipitate, adding an alkali metal waterglass solution to said suspension in amount sufficient to yield 20 to 25 parts by weight of $SiO_2$ for every 100 parts by weight of iron contained in said suspension, thereafter adding nitric acid in amount sufficient to yield for the residue after filtration thereof $K_2O$ to $SiO_2$ proportion of about 1:4 to 1:5, thereafter drying the filter residue and moulding the whole residue into particles, reducing the moulded particled material with a reducing gas at a velocity of about 1 to 2 meters per second and a temperature of about 200 to 350° C. until said material yields at least 30 to 50% of its iron content in the form of free iron.

2. Method in accordance with claim 1 in which said precipitant is a hot aqueous solution of an alkali metal carbonate and in which said waterglass solution is a potassium waterglass solution.

3. Method in accordance with claim 2 in which said alkali metal precipitant solution is a hot soda solution.

WALTER ROTTIG.
HANS WERNER GROSS.
PAUL ROYEN.
KARL SCHENK.

REFERENCES CITED

The following references are of record in the file of this patent:

UNITED STATES PATENTS

| Number | Name | Date |
| --- | --- | --- |
| 1,391,666 | Bosch et al. | Sept. 27, 1921 |
| 1,497,815 | Van Arsdel | June 17, 1924 |
| 2,244,573 | Roberts | June 3, 1941 |